US007009528B2

(12) United States Patent
Griep

(10) Patent No.: US 7,009,528 B2
(45) Date of Patent: Mar. 7, 2006

(54) TWO-WAY REMOTE CONTROL SYSTEM

(75) Inventor: Pieter Dingenis Griep, Louvain (BE)

(73) Assignee: Koninklijke Philips Electronics N.V., Eindhoven (NL)

( * ) Notice: Subject to any disclaimer, the term of this patent is extended or adjusted under 35 U.S.C. 154(b) by 253 days.

(21) Appl. No.: 10/278,284

(22) Filed: Oct. 23, 2002

(65) Prior Publication Data

US 2003/0085814 A1 May 8, 2003

(30) Foreign Application Priority Data

Oct. 26, 2001 (EP) ................................ 01204064

(51) Int. Cl.
*G08C 19/00* (2006.01)
*G09G 5/00* (2006.01)
*G05B 15/00* (2006.01)

(52) U.S. Cl. .......................... 340/825.72; 340/825.69; 340/310.11; 345/169; 700/83

(58) Field of Classification Search ........... 340/825.72, 340/825.69, 310.01, 3.51, 310.11; 700/83
See application file for complete search history.

(56) References Cited

U.S. PATENT DOCUMENTS 6,297,746 B1 * 10/2001 Nakazawa et al. ..... 340/825.69
6,507,762 B1 * 1/2003 Amro et al. .................. 700/83
6,791,467 B1 * 9/2004 Ben-Ze'ev ............. 340/825.72
2002/0014951 A1 * 2/2002 Kramer et al. ............... 340/5.8
2002/0140571 A1 * 10/2002 Hayes et al. ........... 340/825.72
2002/0175828 A1 * 11/2002 Amro et al. ........... 340/825.72

FOREIGN PATENT DOCUMENTS

EP 0825506 A2 2/1998

* cited by examiner

*Primary Examiner*—Brian Zimmerman
*Assistant Examiner*—Clara Yang
(74) *Attorney, Agent, or Firm*—Edward W. Goodman

(57) ABSTRACT

The invention relates to a remote control system comprising an apparatus and a remote control for controlling the apparatus. Both the remote control and the apparatus comprise a receiver and a transmitter for mutually exchanging messages. The remote control can send a request for information to the apparatus, said request comprising a request code for identifying the information. The apparatus is arranged to determine the requested information from the request code and to transmit the requested information to the remote control together with an identifier. The remote control is arranged to process the received information in dependence on correspondence between said identifier and said request code.

12 Claims, 2 Drawing Sheets

TWO-WAY REMOTE CONTROL SYSTEM

FIELD OF THE INVENTION

The invention relates to a remote control system comprising an apparatus, and a two-way remote control for controlling the apparatus.

The invention also relates to an apparatus and a remote control for use in the above system.

The invention also relates to a method of controlling an apparatus with a two-way remote control.

BACKGROUND OF THE INVENTION

A known example of a remote control system of the type defined in the opening paragraph is an audio system with a two-way remote control that uses a messaging protocol to retrieve status messages on a screen of the remote control. The messaging protocol is used to display information concerning the current values of system parameters such as the audio volume or the selected audio source. For that purpose, the remote control of the known remote control system is capable of sending a request message to the audio system. The request message comprises a code of some kind to indicate which type of information is requested. The request code is interpreted by the audio system and the proper information is transmitted back to the remote control. Status information can be sent as a predefined status code, requiring the presence of a lookup table or translation algorithm in the remote control that translates the status code into the proper status message. That message is then displayed on the display screen of the remote control. Alternatively, the status message is sent to the remote control as plain text, so that it can be displayed directly. This solution is most common in status messaging protocols, since no lookup table or translation is required on the remote control.

A disadvantage of the known system is that if the remote control can display more than one status message on a single screen, and particularly if a multi-tasking operating system is running on the remote control, it may be unclear to which status message field on the display screen a received status message pertains. Depending on how the operating system is designed, multiple status requests may be transmitted successively without awaiting the related status messages from the controlled device. Due to physical communication failures some requested status messages may not have been received by the remote control. If the operating system is multi-tasking, the status message can appear at an arbitrary time in an internal buffer while the operating system is busy with other tasks. When more than one status message field is present on the screen of the remote control, the operating system will not know in which field to put the status message that is present in the buffer.

OBJECT AND SUMMARY OF THE INVENTION

It is an object of the invention to provide an improved system and method of the type defined in the opening paragraph. To that end, both the remote control and the apparatus of the remote control system according to the invention comprise a receiver and a transmitter for mutually exchanging messages, the remote control being arranged to send a request for information to the apparatus, said request comprising a request code for identifying the information, the apparatus being arranged to determine the requested information from the request code and to transmit the requested information to the remote control, the remote control being arranged to process the requested information, the apparatus being arranged to transmit the requested information together with an identifier and the remote control being arranged to process the received information in dependence on correspondence between said identifier and said request code. It is thus achieved that the remote control can always deduce from the identifier to which request for information a received message is related. In a simple embodiment the identifier sent along with the status message to the remote control is identical to the request code. The remote control need only check whether the received identifier equals a request code of an earlier sent request for information. Alternatively, the identifier corresponds in any predetermined manner to the request code in such a way that the remote control can determine correspondence between a received identifier and a request code.

In an embodiment the remote control of the system according to the invention comprises a display screen for presenting the requested information to a user. It is thus achieved that a user of the system can read status information of the system on the remote control which is much easier to read than a display on a remote apparatus.

In an embodiment of the system according to the invention the request code and the identifier also identify a location on the display screen, the remote control being arranged to determine a target location on the display screen for displaying the requested information in accordance with the identifier. In this way it is achieved that the remote control need store very little information about the requests transmitted to the apparatus. It needs only be aware of the fields to be displayed on the display screen. The request code may be simply a serial number of a display field, or a complete specification of the coordinates and/or dimensions and/or formatting of the display field. Upon receiving an identifier along with requested information, the remote control can directly display the information in the field indicated by the identifier or if, the identifier is not identical to a transmitted request code, it can first derive the original request code and proceed similarly. If the request code is just a serial field number, a very simple look-up action has to be performed to obtain the coordinates and/or dimensions and/or formatting of the target display field.

The requested information may be status information of the controlled apparatus, such as power on/off status, audio volume, selected source etc. The information itself can be just plain text or a predetermined code, requiring a look-up action by the remote control to obtain the textual message to be conveyed to the user on the display screen.

The invention is particularly suitable for controlling electronic equipment, e.g. audio and/or video equipment, which is positioned at a distance from the user, so that status information of the system can be read more conveniently from the remote control display screen. The display screen of the remote control may even be the only means for conveying status information to the user.

BRIEF DESCRIPTION OF THE DRAWINGS

These and other aspects of the invention are apparent from and will be elucidated, by way of a non-limitative example, with reference to the embodiment(s) described hereinafter. In the drawings.

DESCRIPTION OF EMBODIMENTS

Figure 1:
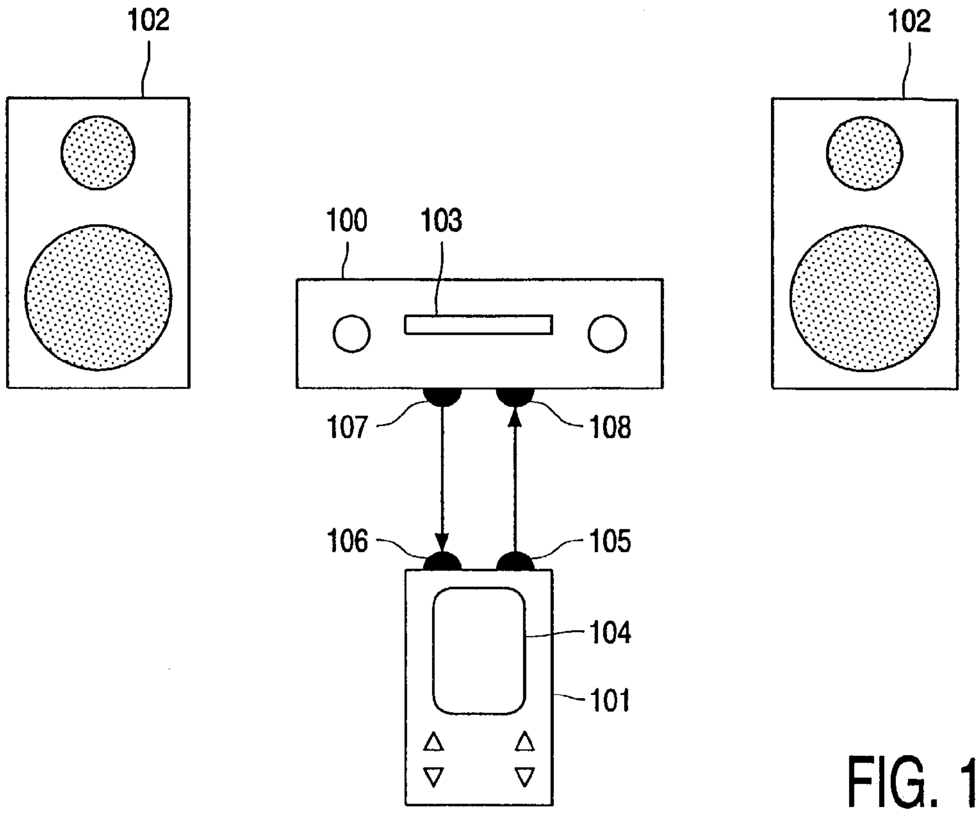
FIG. 1 shows a diagram of an audio system as a remote control system embodying the invention.

FIG. 1 shows a diagram of an audio system as a remote control system embodying the invention. An audio system 100 is controlled by a remote control 101, which may be a dedicated remote control, a universal remote control, a learnable remote control, or any other wired or wireless device which may be used as a remote control, for example a personal digital assistant or a mobile phone. The audio system 100 has speakers 102 for reproducing audio signals and a graphical display 103 for displaying messages, e.g. status information. The remote control 101 has a graphical display 104 as well. Both displays may be of any suitable type. For example the display 104 of the remote control 101 may be of the LCD type, while the display 103 of the audio system may be more suitable for viewing from a distance, e.g. light emitting segments or CRT type. The remote control 101 comprises an infrared (IR) transmitter 105 for transmitting messages to the audio system 100. These messages may comprise control commands, for example for increasing the audio volume, or status request messages, for example for displaying the current value of the audio volume on the displays 103 and 104. For both types of messages, predefined command and request codes are used to identify the proper command or the type of information requested. The audio system 100 comprises an IR receiver 108 capable of receiving the IR messages transmitted by the IR transmitter of the remote control 101. If a received IR message comprises a control command the audio system 100 will act in accordance with that control command, for example by turning up the audio volume. If the received IR message comprises a status request, the audio system 100 identifies the requested information in accordance with the request code. The audio system 100 comprises an IR transmitter 107 for transmitting the requested status information back to the remote control 101. Along with the status information the audio system 100 also transmits the request code, which it received to identify the requested information, back to the remote control 101. This enables the remote control 101 to determine in a very easy way which status information is received and hence how to process that information. For example, the received status information may be displayed on a particular field of the display screen 104 of the remote control 101.

Figure 2:
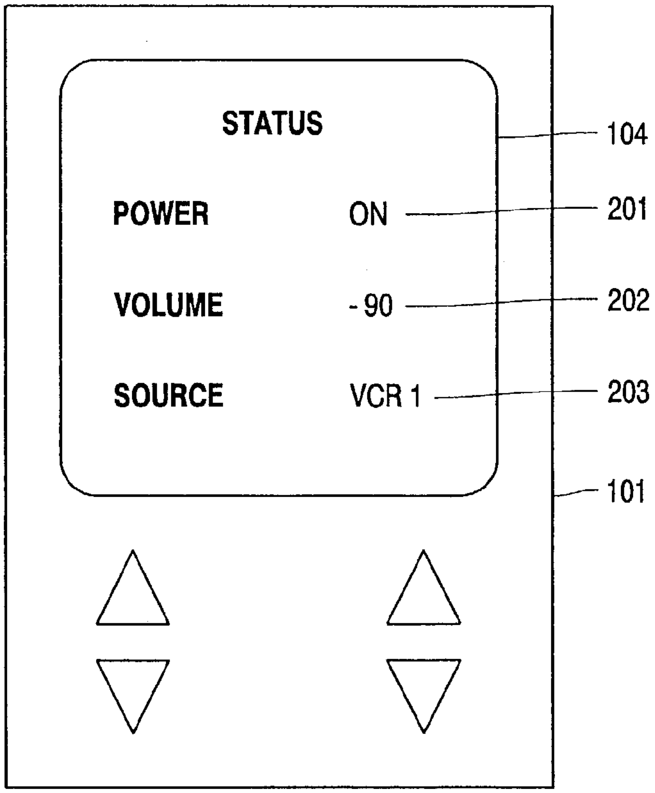
FIG. 2 shows an example of status information displayed on the screen of the remote control.

FIG. 2 shows an example of status information received from the audio system 100 and displayed on the screen 104 of the remote control 101. In the example three status messages are displayed in three status message fields 201, 202 and 203. Each status message field is characterized by the following information:

field width, XY coordinate location on the screen character font type and size of the status message request code that indicates the status message The following table gives a number of request codes and the corresponding status messages.

| Request Code | Request | Feedback message | Remarks |
|---|---|---|---|
| 0x01 | Power status | ON<br>OFF | |
| 0x02 | Volume status | MAX<br>+NNN<br>−NNN<br>MIN | N stands for a single digit (0 . . . 9) |
| 0x03 | Video input source | TV<br>DSS<br>DVD<br>LD<br>VCR1 | |

In order to refresh the screen 104 of the remote control 101 the request codes of the status message fields are read and sent to the audio system 100. Then the audio system 100 responds with the corresponding status messages, each time preceded by the request code which serves as a message identifier. Next the status messages are put into the correct status message field on the screen 104 by matching the message identifier with the request code of the respective status message field.

The request codes in the given example are hexadecimal codes. However, they may be in any suitable format, for example, a textual item such as "volume" and "source", or even a full specification of the target status message field on the display screen 104, i.e. its screen coordinates, dimensions, font type etc.

The status messages are in textual form, but may alternatively be in coded form. In that case the remote control needs to have means for decoding the message, e.g. consulting a look-up table, to obtain the textual message or graphical message to be displayed.

Figure 3:
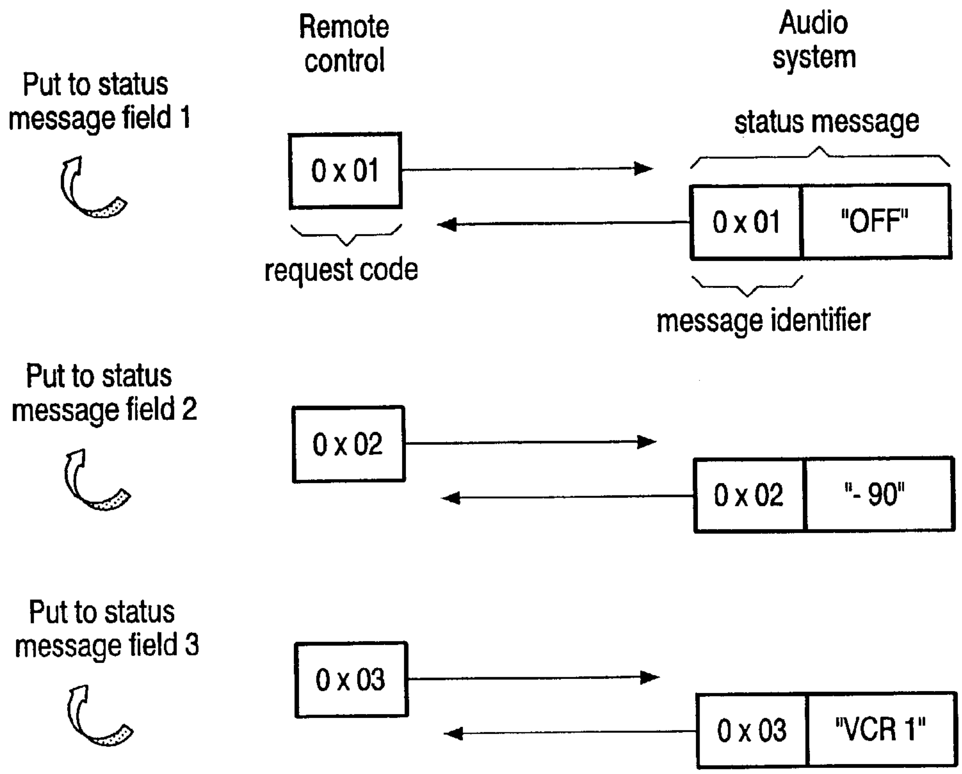
FIG. 3 illustrates the process of sending request codes and receiving status messages with a message identifier.

FIG. 3 illustrates the process of sending request codes and receiving status messages with a message identifier. For each status message field a request message is transmitted to the audio system 100, which message comprises a request code indicating the requested information. The return message comprises a message identifier which is identical to the request code. As a result the remote control 101 need only check the identifier and match it with one of the request codes related to the status message fields.

Figure 4:
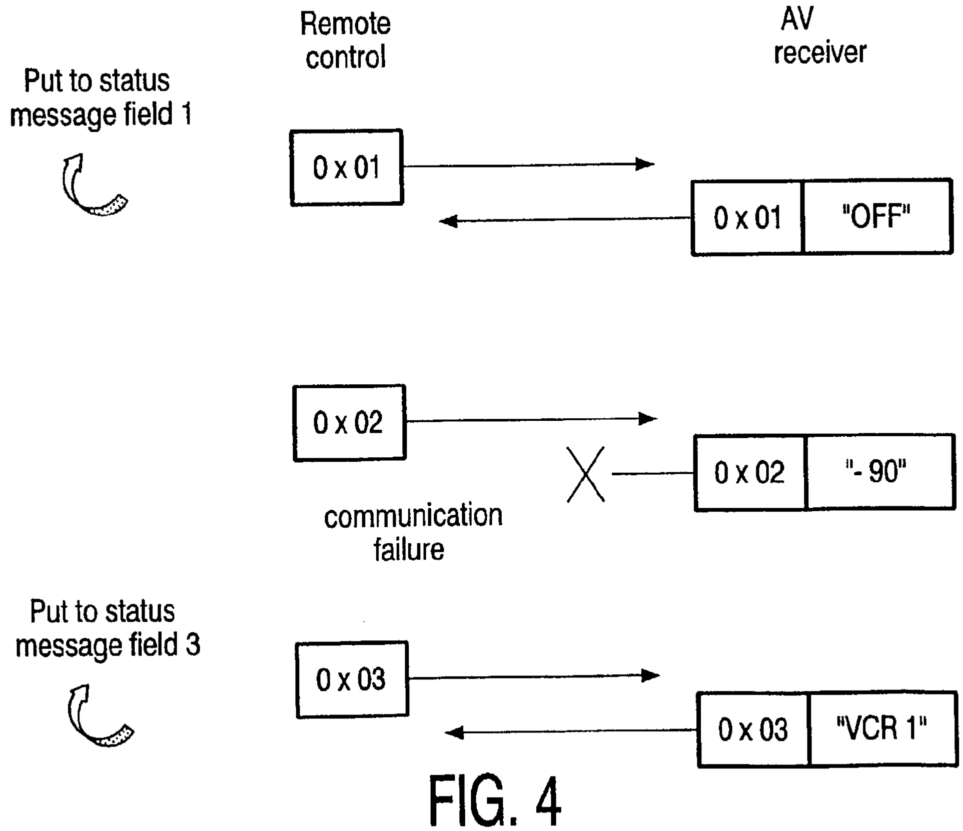
FIG. 4 illustrates the process when a communication failure occurs.

FIG. 4 depicts the situation wherein one of the messages is not received due to some communication failure. In the example the second status message is transmitted by the audio system 100 but not received by the remote control 101. In such a situation a conventional remote control would put the content of the third status message into the second status message field 202, i.e. the value "VCR 1" in the field "Volume". In the system according to the invention, however, the remote control 101 finds a match between the message identifier of the secondly received status message with the request code of the third status message field 203, and consequently puts the content of that message in the correct field. The second field 202 is left empty or shows a default or previously received value. Instead of the status message transmitted by the audio system 100, the status request transmitted by the remote control 101 might have been lost due to a communication failure. In that case there would not have been a second status message transmitted by the audio system 100. The final result would have been the same as in the situation where the status message was lost, as described above.

Note that either or both the audio system 100 or the remote control 101 may be controlled by a multi-tasking operating system. In that case messages may be processed in arbitrary order. For example, the audio system 101 may receive various status requests while being busy with other tasks. Once another task is completed, it may process one or more of the status requests in arbitrary order, for example, in dependence on the available time or resources. It is an achievement of the present invention that the status messages are still properly processed by the remote control. The only visual effect, if perceptible at all, is that the status message fields are updated in a different order than from top to bottom. The same may happen at the remote control side: status messages may be received in a particular order and buffered, and subsequently processed in a different order. In this way a very reliable and robust remote control system is obtained.

In summary, the invention relates to a remote control system comprising an apparatus and a remote control for controlling the apparatus. Both the remote control and the apparatus comprise a receiver and a transmitter for mutually exchanging messages. The remote control can send a request for information to the apparatus, said request comprising a request code for identifying the information. The apparatus is arranged to determine the requested information from the request code and to transmit the requested information to the remote control together with an identifier. The remote control is arranged to process the received information in dependence on correspondence between said identifier and said request code.

Throughout the figures, same reference numerals indicate similar or corresponding features. Some of the features indicated in the drawings are typically implemented in software and as such represent software entities, such as software modules or objects.

Although the invention has been described with reference to specific illustrative embodiments, variants and modifications are possible within the scope of the inventive concept. Thus, for example, instead of application to an audio system the invention may very well be applied to a video or computer system. The invention is also very suitable for home control systems wherein the controlled apparatuses may be located in rooms other than the room in which the user is currently present. In such a case, the status of the controlled apparatuses is not directly apparent so that a status display on a remote control is very attractive. In such systems it is very likely that communication failures occur now and then, and that various apparatuses have different response times so that the order and successful reception of status messages is highly unpredictable. Instead of a remote control dedicated to the controlled system, a universal remote control of PDA running a remote control software application or a mobile phone with a built-in remote control function may be used.

The use of the verb 'to comprise' and its conjugations does not exclude the presence of elements or steps other than those defined in a claim. In the claims, any reference signs placed between parentheses shall not be construed as limiting the claim. The invention can be implemented by means of hardware comprising several distinct elements, and by means of a suitably programmed computer. In the device claim enumerating several means, several of these means can be embodied by one and the same item of hardware.

A 'computer program' is to be understood to mean any software product stored on a computer-readable medium, such as a floppy-disk, downloadable via a network such as the Internet, or marketable in any other manner.

The invention claimed is:

1. A remote control system comprising an apparatus and a remote control for controlling the apparatus, both the remote control and the apparatus comprising a receiver and a transmitter for mutually exchanging messages, the remote control being arranged to send a request for information to the apparatus, said request comprising a request code for identifying the information, the apparatus being arranged to determine the requested information from the request code and to transmit the requested information to the remote control, the remote control being arranged to process the requested information, the apparatus being arranged to transmit the requested information together with an identifier and the remote control being arranged to process the received information in dependence on correspondence between said identifier and said request code.

2. A system as claimed in claim 1, wherein the remote control comprises a display screen for presenting the requested information to a user.

3. A system as claimed in claim 2, wherein the request code and the identifier also identify a location on the display screen, the remote control being arranged to determine a target location on the display screen for displaying the requested information in accordance with the identifier.

4. A system as claimed in claim 1, wherein the requested information comprises status information concerning a status of the apparatus.

5. A system as claimed in claim 4, wherein the status information comprises textual information.

6. A remote control for controlling an apparatus, the remote control comprising a receiver and a transmitter for exchanging messages with the apparatus, the remote control being arranged to send a request for information to the apparatus, said request comprising a request code for identifying the information, the remote control also being arranged to receive and process the requested information, wherein the remote control is arranged to decode from the requested information an identifier, the remote control also being arranged to process the received information in dependence on a correspondence between said identifier and said request code.

7. A remote control as claimed in claim 6, also comprising a display screen for presenting the requested information to a user.

8. A remote control as claimed in claim 7, wherein the request code and the identifier also identify a location on the display screen, the remote control being arranged to determine a target location on the display screen for displaying the requested information in accordance with the identifier.

9. A remote control as claimed in claim 6, wherein the requested information comprises status information concerning a status of the apparatus.

10. A computer program product enabling a programmable device, when executing said computer program product, to function as a remote control as defined in claim 6.

11. An apparatus for use in a remote control system, the apparatus comprising a receiver and a transmitter for mutually exchanging messages with a remote control, the apparatus being arranged to receive a request for information from the remote control, said request comprising a request code for identifying the information, the apparatus also being arranged to determine the requested information from the request code and to transmit the requested information to the remote control, the apparatus also being arranged to transmit the requested information together with an identifier corresponding to the request code.

12. A method of controlling an apparatus with a remote control, comprising a step of sending a request for information from the remote control to the apparatus, said request comprising a request code for identifying the information, a step of determining the requested information from the request code, and transmitting the requested information from the apparatus to the remote control together with an identifier, and a step of processing the received information in dependence on correspondence between said identifier and said request code.

* * * * *